United States Patent [19]
Odobasic

[11] Patent Number: 4,593,889
[45] Date of Patent: * Jun. 10, 1986

[54] LAMINATED TUBULAR LINK

[76] Inventor: Steven L. Odobasic, 2885 Aurora Ave., #16, Boulder, Colo. 80303

[*] Notice: The portion of the term of this patent subsequent to Jun. 4, 2002 has been disclaimed.

[21] Appl. No.: 511,955

[22] Filed: Jul. 8, 1983

Related U.S. Application Data

[63] Continuation-in-part of Ser. No. 412,095, Aug. 27, 1982, Pat. No. 4,521,003.

[30] Foreign Application Priority Data

Mar. 18, 1983 [GB] United Kingdom ............... 8307487

[51] Int. Cl.$^4$ .................... B60G 11/18; B64C 27/48; F16F 1/14
[52] U.S. Cl. .................... 267/57.1 A; 267/63 A; 267/141.1; 267/153; 267/154; 403/228; 416/134 A; 416/141; 464/97
[58] Field of Search .................... 267/57.1 R, 57.1 A, 267/63 A, 141.1, 152, 153, 154; 280/695, 700, 717, 721; 464/94, 96, 97; 416/134 A, 141; 403/220, 222, 224, 225, 228, 291

[56] References Cited

U.S. PATENT DOCUMENTS

| | | | |
|---|---|---|---|
| 1,720,545 | 7/1929 | Dickey | 267/141.1 X |
| 2,216,455 | 10/1940 | Piron | 267/57.1 R |
| 2,246,833 | 6/1941 | Beemer | 403/225 X |
| 2,251,698 | 8/1941 | Willson | 267/57.1 A |
| 2,267,312 | 12/1941 | Smith | 267/57.1 R |
| 2,378,099 | 6/1945 | Piron | 403/220 |
| 2,448,769 | 9/1948 | Chamberlain | 403/222 X |
| 2,531,059 | 11/1950 | Krotz | 267/57.1 R |
| 2,575,533 | 11/1951 | Seibel | 416/138 |
| 2,940,785 | 6/1960 | Haushalter | 267/51.1 R |
| 3,020,036 | 2/1962 | Kleinschmidt | 267/154 |
| 3,052,305 | 9/1962 | Jones et al. | 416/21 |
| 3,261,407 | 7/1966 | Culver et al. | 416/112 |
| 3,292,711 | 12/1966 | Peterson | 403/220 X |
| 3,330,362 | 7/1967 | Kastan | 416/132 R |
| 3,336,021 | 8/1967 | Kramer | 267/154 |
| 3,342,041 | 9/1967 | Nebiker, Jr. | 403/224 X |
| 3,666,301 | 5/1972 | Jorn | 267/57.1 A |
| 3,669,566 | 6/1972 | Bourquardez et al. | 416/134 R |
| 3,690,639 | 9/1972 | Brandon et al. | 267/57.1 R |
| 3,765,267 | 10/1973 | Bourquardez et al. | 74/581 |
| 3,769,813 | 11/1973 | Okada | 464/97 X |
| 3,787,102 | 1/1974 | Moran | 267/57.1 R |
| 3,791,234 | 2/1974 | Kastan et al. | 74/579 R |
| 3,797,964 | 3/1974 | Hanson | 416/134 R |
| 3,855,817 | 12/1974 | Stuemky et al. | 464/51 |
| 3,881,711 | 5/1975 | Lemaitre | 267/57.1 R |
| 3,905,208 | 9/1975 | Oyama et al. | 464/88 |
| 4,007,924 | 2/1977 | Jorn et al. | 267/57.1 R |
| 4,111,605 | 9/1978 | Roman et al. | 416/141 |
| 4,171,920 | 10/1979 | Kramer et al. | 267/154 |
| 4,222,709 | 9/1980 | Mouille | 416/134 A |
| 4,349,184 | 9/1982 | Peterson et al. | 403/228 X |
| 4,352,631 | 10/1982 | Buchs et al. | 416/134 A |
| 4,521,003 | 6/1985 | Odobasic | 267/57.1 A |

FOREIGN PATENT DOCUMENTS

| | | | |
|---|---|---|---|
| 1580358 | 1/1970 | Fed. Rep. of Germany | 267/57.1 A |
| 286604 | 2/1953 | Switzerland | 403/222 |
| 411622 | 6/1934 | United Kingdom | 267/57.1 R |
| 748587 | 12/1953 | United Kingdom | . |
| 851377 | 11/1957 | United Kingdom | . |
| 2105818 | 3/1983 | United Kingdom | 267/57.1 R |

Primary Examiner—Bruce H. Stoner, Jr.
Assistant Examiner—Richard R. Diefendorf
Attorney, Agent, or Firm—Howson and Howson

[57] ABSTRACT

A structural element which is particularly suited for use in accommodating torsional displacement while carrying various axial, transverse, and flexural loads. The structural element is of a multi-component construction which includes at least one elongated tube-like thin wall member having a pair of longitudinally-extending edges. The wall member is laterally engaged and constrained by one or more stabilizers which permit yielding relative motion between the edges when torque is applied.

71 Claims, 26 Drawing Figures

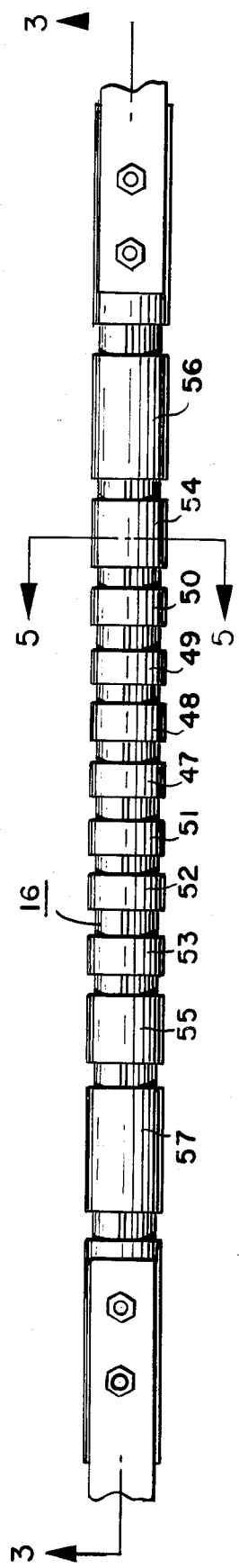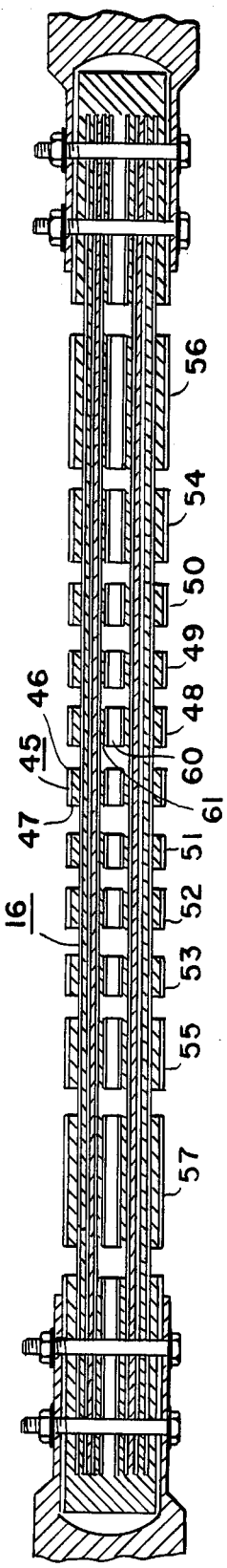

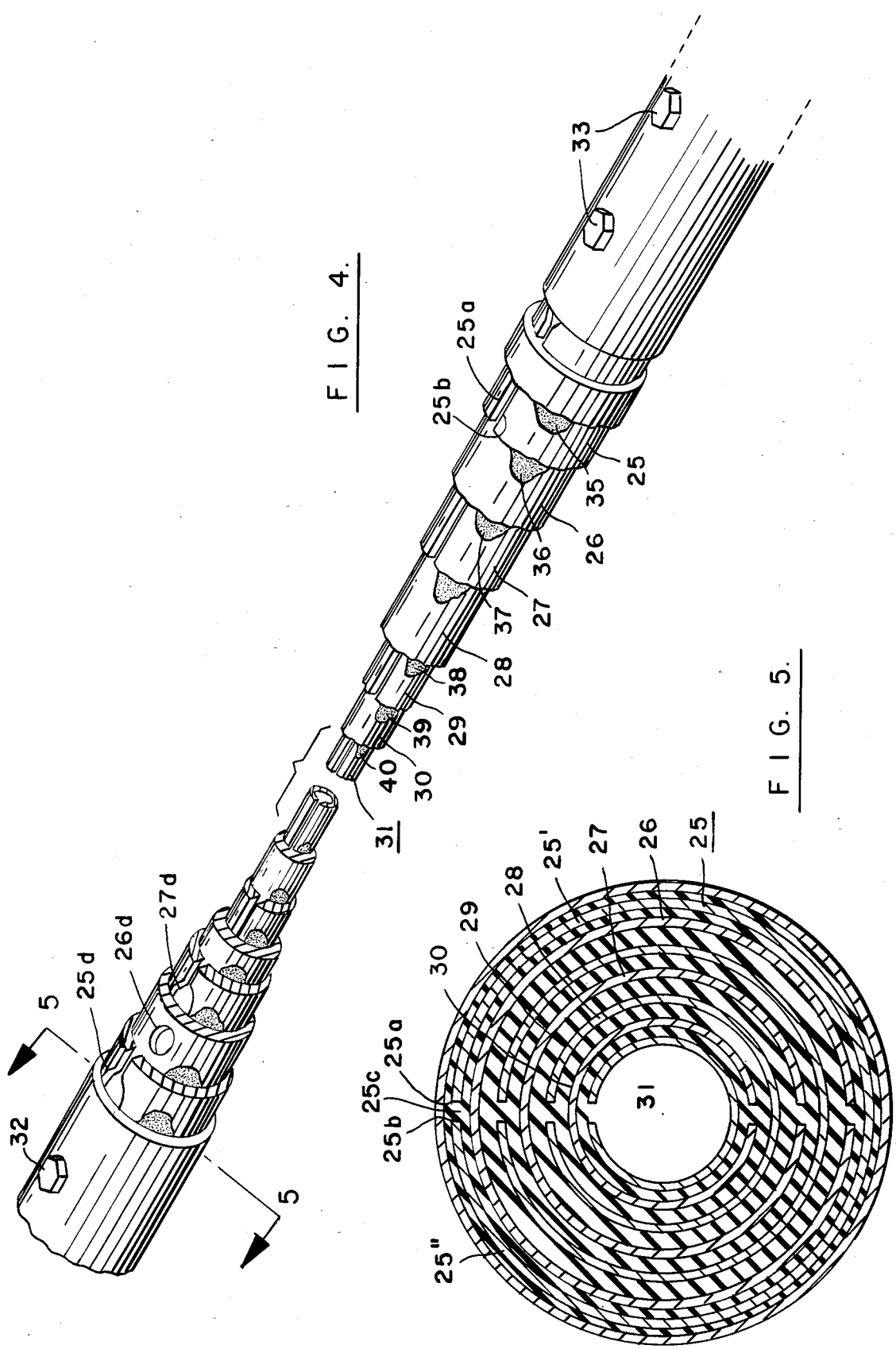

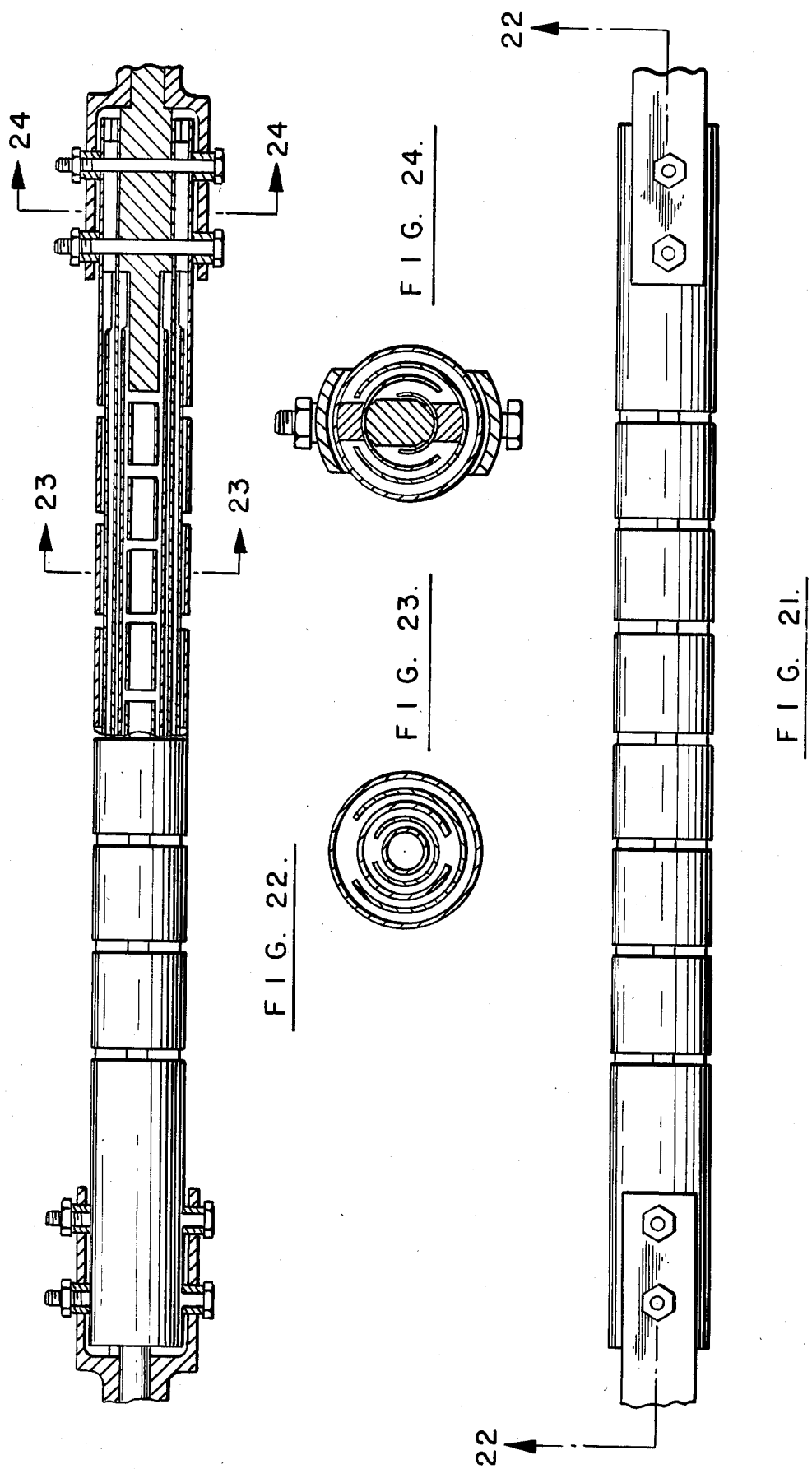

LAMINATED TUBULAR LINK

CROSS-REFERENCE TO RELATED APPLICATION

The present application is a continuation-in-part of copending application Ser. No. 412,095, filed on Aug. 27, 1982, now U.S. Pat. No. 4,521,003.

FIELD OF THE INVENTION

The present invention relates to structural elements, and more particularly, the present invention relates to machine structural elements which are designed to carry various axial, transverse and flexural loads while accommodating torsional displacements.

BACKGROUND OF THE INVENTION

There are various types of mechanical systems in which it is necessary to accommodate torsional motion while providing resistance to axial, flexural and transverse loading. The torsional motions and loads may be applied either statically or dynamically in various operating environments.

In some mechanical applications, connecting links fabricated from tubes have been used to transmit such torsional motion while sustaining such loads. While hollow tubes are axially and transversely strong, and flexurally stiff, they are also generally quite stiff in torsion, depending upon the material of which they are made, their wall thicknesses, diameters, lengths, etc. With such tubes, long lengths are often required if substantial torsional deflection, opposed to torque transmission, is desirable between the opposite ends of the tube.

Devices for use in transferring and dampening torsional loads are known. An example of such a device may be found in U.K. Pat. No. 748,587. In the disclosed device, a series of curved metal tube sections are clamped together in a stack in frictional engagement with one another to dampen torsional loads applied at opposite ends of the stack of tube sections. While this device may function satisfactorily in certain applications, it is not suited for those applications requiring the accommodation of substantial angular deflections for prolonged periods of time.

A particularly severe application for a connecting link exists in conjunction with mounting the rotors of a helicopter to its hub. Customarily, the rotors are connected to the hub by various means designed to resist various combinations of ultimate and cyclic loads, such as described above, resulting from the rotation of the rotor and its in-flight pitch changes. Commercially satisfactory links must be capable of withstanding various loads for prolonged periods of time without failure under a wide range of environmental conditions involving operation over a wide range of temperatures and under various corrosive conditions.

Over the years, several types of rotor retention structures have been proposed. Early retention structures included a series of laminated straps connected between the hub and the rotors. An example of such construction may be found in U.S. Pat. No. 2,961,051 (Wilford). Some helicopters have been manufactured using so-called wire wound tension torsion tie bars which comprise a plurality of fine wires wrapped around bushings and bonded together in an elastomeric matrix. An example of such a link may be found in U.S. Pat. No. 3,520,637 (Tobey). Yet other helicopters have utilized so-called elastomeric bearings to connect rotors to hubs. An example of such a construction may be found in U.S. Pat. No. 4,142,833 (Rybicki).

While the various types of rotor retention systems such as disclosed in the aforementioned patents may function satisfactorily for the particular helicopter application for which they have been designed, there is a need for a compact yet lightweight link which is capable of withstanding the various loads which are applied between the rotor of a helicopter and its hub while permitting rotor pitch changes to be made. For instance, such a link must have substantial axial strength in order to withstand the applied centrifugal forces; it must have substantial flexural modulus in order to resist bending moments caused by lift, as well as lead-lag loads on the rotor; and it must be capable of accommodating cyclic torsional motion between the hub and the rotor for flight control and trim purposes. In addition, a satisfactory link must be resistant to fatigue and must be capable of operating effectively in hostile environments.

OBJECTS OF THE INVENTION

With the foregoing in mind, a primary object of the present invention is to provide a novel structural element which is particularly suited for use in those mechanical applications requiring resistance to various axial, transverse, and flexural loads while accommodating torsional displacements.

Another object of the present invention is to provide an improved structural element which is characterized by axial, transverse and flexural stiffnesses and torsional resilience.

It is another object of the present invention to provide a unique structural element, possessing the aforesaid characteristics, which is capable of functioning effectively under severe ambient operating conditions for a relatively long period of time.

A still further object of the present invention is to provide an improved structural link which has high strain energy density, is lightweight, and is resistant to corrosion and fatigue.

Yet another object of the present invention is to provide an axially strong, flexurally stiff, and torsionally resilient link particularly suited for use in connecting a rotor to a low aerodynamic drag hub of a helicopter.

SUMMARY OF THE INVENTION

More specifically, the present invention provides a structural element which is characterized by axial and transverse strength, flexural stiffness, and torsional resilience, rendering it particularly suited for use in mechanical systems requiring the transfer of high ultimate loads while accommodating torsional motion. To this end, the structural element comprises at least one thin walled member which is extended about a longitudinal axis into a predetermined tube form configuration and which terminates in edges extending lengthwise in spaced relation along the axis. Means is provided on the wall member to afford the application of loads at axially-spaced locations. Stabilizer means yieldingly engages the wall member intermediate the axially-spaced locations of load application for sustaining the transverse configuration of the wall member during the application of various loads while resiliently accommodating relative motion between the edges when torque is applied. The stabilizer means may include one or more elastomeric members engaging the wall member laterally at one or more spaced locations along its length either interiorly, or exteriorly, or both. The stabilizer means may also include one or more complementary wall members interarranged with the first-mentioned wall member. A layer of elastomeric material is interposed between adjacent overlapping portions of the wall members to accommodate the relative motion between the edges while sustaining the structural integrity of the cross-sectional configuration thereof.

BRIEF DESCRIPTION OF THE DRAWINGS

The foregoing and other objects, features and advantages of the present invention should become apparent from the following description when taken in conjunction with the accompanying drawings, in which:

FIG. 2 is a front elevational view of a link illustrated in FIG. 1;

FIG. 3 is a longitudinal sectional view of a link taken on line 3—3 of FIG. 2;

FIG. 4 is a fragmentary perspective view of the link illustrated in FIG. 2 but with portions broken away to expose details of construction thereof;

FIG. 5 is an enlarged transverse sectional view taken on line 5—5 of FIG. 4;

FIG. 21 is a plan view of a link embodying the present invention;

FIG. 22 is a longitudinal sectional view taken on line 22—22 of FIG. 1;

FIG. 23 is a transverse sectional view taken on line 23—23 of FIG. 22;

FIG. 24 is a sectional view taken on line 24—24 of FIG. 22; and

DESCRIPTION OF THE PREFERRED EMBODIMENTS

Figure 1:
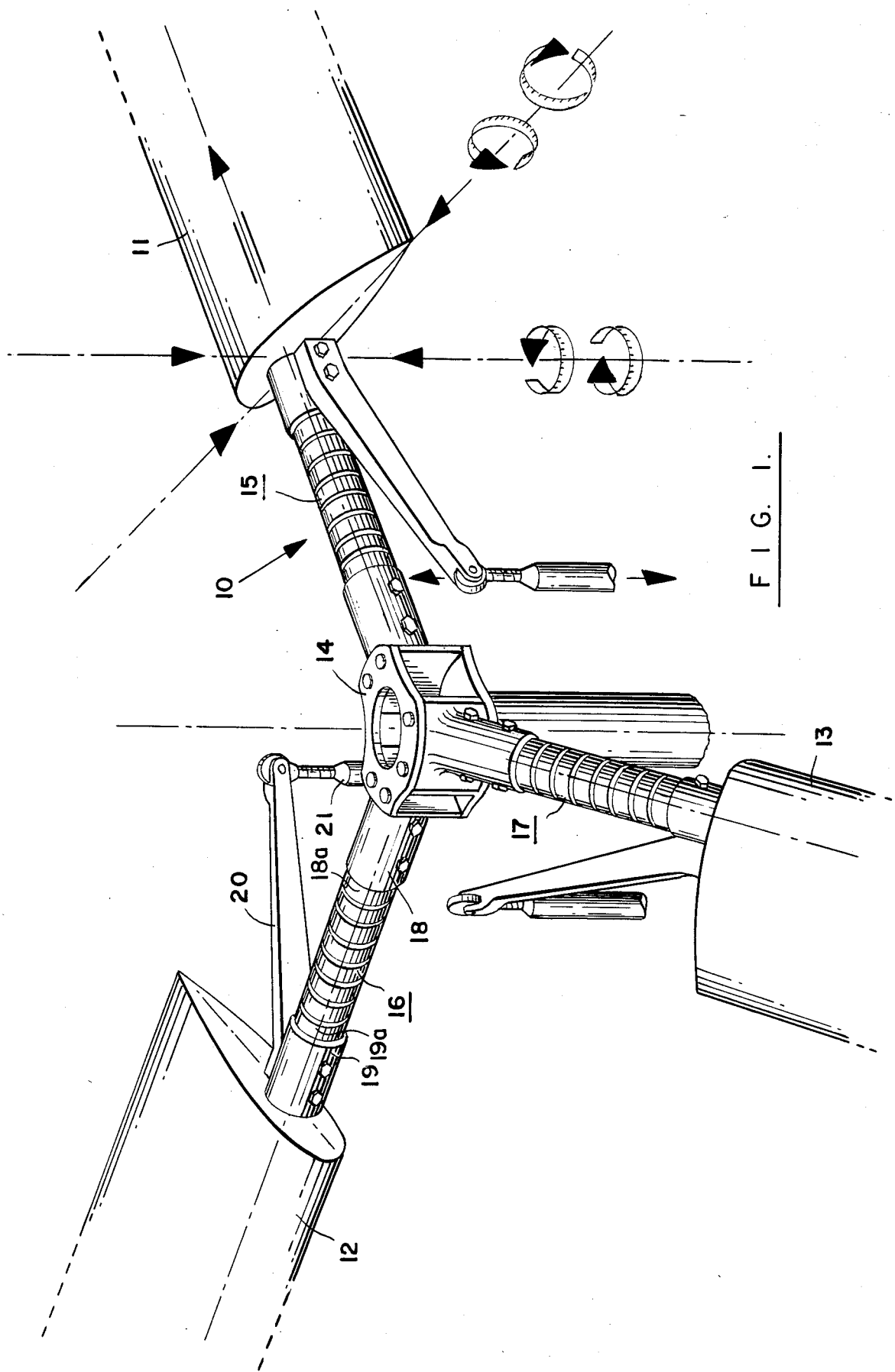
FIG. 1 is a fragmentary perspective view of a helicopter rotor system in which is installed structural link-like elements embodying the present invention.

Referring now to the drawings, FIG. 1 illustrates a mechanical system 10 in which the structural elements of the present invention find particular utility. In the illustrated system 10, helicopter rotors 11, 12 and 13 are connected to a central hub 14 by means of structural elements, or links, 15, 16 and 17 embodying the present invention. Each link, such as the link 16, is fastened at its inboard end to a fitting 18 carried on the hub 14 and is fastened at its outboard end to a fitting 19 connected to the rotor 12. The pitch of each rotor, such as the rotor 12, is controlled by means of an arm 20 connected at its outer end to the rotor fitting 19 and at its inner end to a control push-pull rod 21 connected in the customary fashion to a cyclic and collective swash plate.

Substantial loads are carried by each link, such as the link 15, when the rotor connected thereto rotates to generate lift in the course of flight. The loads include an axial load which is directed along the longitudinal axis of the link 15 and which is caused by centrifugal force and a bending moment caused by the lift in the flapping plane and drag in the lead-lag plane. Transverse shear loads are also present. Some of the major forces which are present in the rotating system are indicated by the arrows in FIG. 1.

In horizontal flight, the pitch of the rotors may vary cyclically through an included angle of +5 degrees with an ultimate angular displacement of up to +25 degrees. In order to effect the desired degree of pitch change it is important for the links 15-17 to have a sufficient amount of torsional resilience as to enable the pitch to be changed with minimum torque. Also, it is desirable for the links 15-17 to be capable of providing this function with a minimum drag profile of the hub. The links must also be relatively light in weight, fatigue resistant, and resistant to degradation throughout a wide range of environmental conditions.

Figure 25:
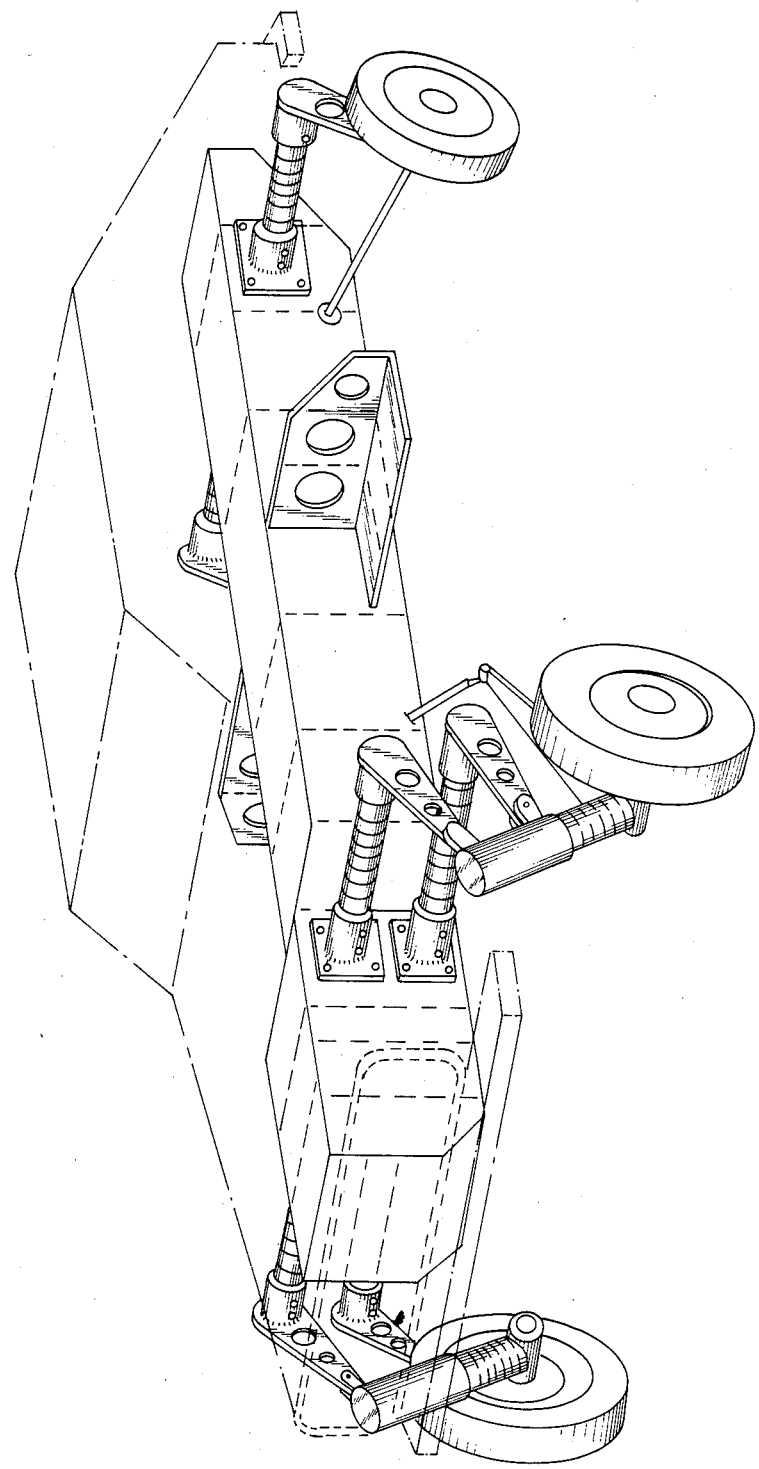
FIG. 25 is a schematic perspective view of a vehicle suspension system incorporating structural elements embodying the present invention.

In accordance with the present invention, the links 15-17 are designed to have axial, transverse and flexural load carrying capability, and torsional resilience so that they are capable of meeting the aforementioned requirements caused by the severe static and dynamic loads encountered in a helicopter rotor system. While the structural elements, or links, of the present invention will be described in combination with a helicopter rotor system, it should be apparent that they may be utilized in other mechanical applications where one or more of their structural and functional properties may be particularly desirable. For example, another application where the links may be employed is in a wheel suspension system for a vehicle, such as an aircraft or an automobile as illustrated in FIG. 25.

Referring now to FIG. 4, each link, or structural element, such as the link 16, comprises at least one, and preferably a plurality of elongated thin wall members 25, 26, 27, 28, 29, 30 and 31 interarranged, or nested, together. Each wall member, such as the outer wall member 25, has a predetermined transverse cross-sectional configuration which, in the illustrated embodiment, is substantially circular. Each is also of a different diameter. See FIG. 5. Each thin wall member, such as the wall member 25, has a pair of edges 25a and 25b which extend lengthwise continuously from end to end and which form a gap or slot 25c therebetween. In the illustrated embodiment, the edges 25a and 25b extend in closely spaced parallel confronting relation a sufficient distance apart as not to contact one another during application of the maximum torque which the link 16 is designed to transfer. As will become more fully apparent hereinafter, the longitudinal edges of adjacent, or complementary, wall members such as members 25 and 26 preferably are offset angularly with respect to one another. In the illustrated embodiment of FIGS. 1–5 the angular offset is 180 degrees, i.e., the gaps between the longitudinal edges of the wall members are diametrically opposed. Preferably, the wall members 25–31 are formed of relatively thin wall metal, although they may be fabricated of other materials possessing comparable properties.

For purposes to be discussed more fully hereinafter, the members 25–31 are yieldingly separated from one another in the illustrated concentric relation by means of layers of yieldable material 35–40. Preferably, each layer is of resilient, elastic material, such as elastomeric material which is interposed between the members and bridges the gaps between the edges thereof. While the elastomeric layers may fill the edge gaps, preferably the edge gaps are free of elastomeric material.

A load is applied to the members 25–31 at axially-spaced locations. As best seen in FIGS. 3, 4 and 5, load is applied to each member, such as the member 26 by means of edges such as the edges 26d which engage connectors, such as pins, or bolts, 32 and 33, that pass diametrically through the rotor fitting 19 and the hub fitting 18. Thus, each member carries a share of the total load applied to the link. By locating the point of load application at axially-spaced locations diametrically opposite and equidistant from the longitudinal edges of each member, such as the edges 25a and 25b of the member 25, the member 25 has working wall portions 25' and 25" which extend arcuately in opposite directions from the point of load application to the edges 25a and 25b. As will be discussed, this location of the point of load application equidistant from the edges 25a and 25b provides a minimum suppression of warping of the longitudinal edges of the wall portions 25' and 25", thereby providing the maximum degree of torsional resilience.

The warping phenomenon may best be visualized by reference to the simplified embodiment illustrated in FIGS. 6–9. As seen therein, the single wall member 125 has longitudinal edges 125a and 125b and end edges 125f and 125g, like the member 25. When a torque is applied at axially-spaced locations 125d and 125e to the member 125, the longitudinal edges 125a and 125b move lengthwise in opposite directions relative to one another and toward one another as indicated by the arrows and broken lines in FIG. 8. This, in turn, causes the edges 125f and 125g at opposite ends of the member 125 to warp with respect to a plane orthogonal to the longitudinal axis of the member 125. This warping is illustrated greatly enlarged in the simplified views of FIGS. 7 and 8. Application of torque in the opposite direction about the longitudinal axis causes the edges to move oppositely.

Figures 6, 7A:
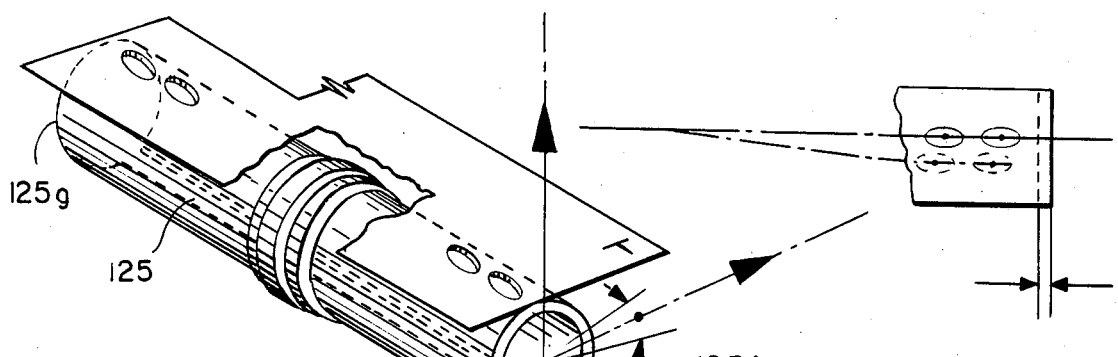
FIG. 6 is a perspective schematic view of a simplified form of structural element of the present invention showing the manner in which various loads may be applied.
FIG. 7A is a fragmentary plan view of the structural element illustrated in FIG. 7, the view illustrating greatly enlarged the lengthwise foreshortening which results when the structural element is subjected to a torsional load about its longitudinal axis.
Figure 7:
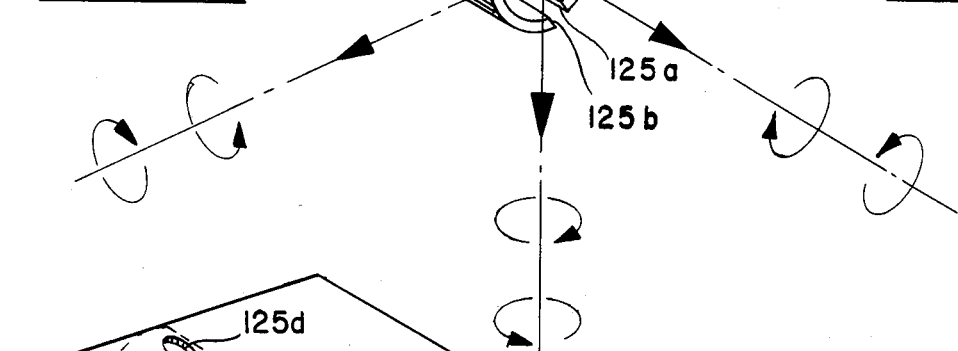
FIG. 7 is a view similar to FIG. 6 but illustrating the angular deflection and foreshortening of the structural element when subjected to a pure torsional load.

Bending and shear loads applied to the relatively thin wall member 125 as illustrated in FIG. 6, can induce buckling or other types of instabilities depending on the magnitudes and directions of these loads. Thus, it is important for structures of this preformed configuration to be sustained in their preformed configurations in a manner which accommodates these loads without failure and which accommodates the relative movement of the edges caused by the applied torque.

Figure 11:
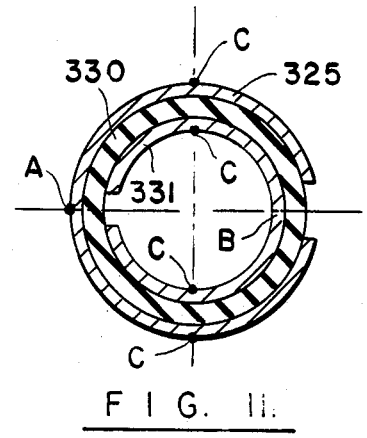
FIG. 11 is a transverse sectional view similar to FIG. 10 but illustrating still another form of stabilizer.
Figure 8:
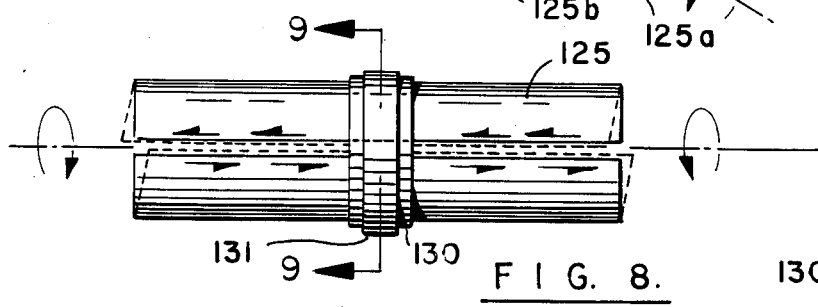
FIG. 8 is an inverted plan view of the structural element illustrated in FIGS. 6 and 7, the view illustrating the movement of the longitudinal edges of the element and the warping of the opposite free end edges of the element when subjected to a torsional load.
Figure 10:
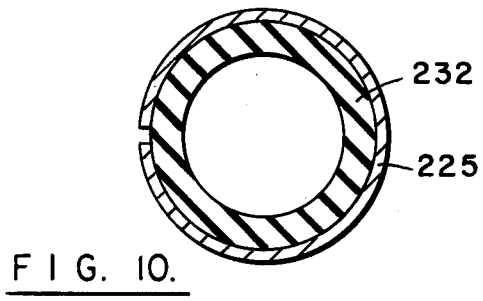
FIG. 10 is a transverse sectional view similar to FIG. 9 but illustrating an internally-mounted stabilizer.
Figure 9:
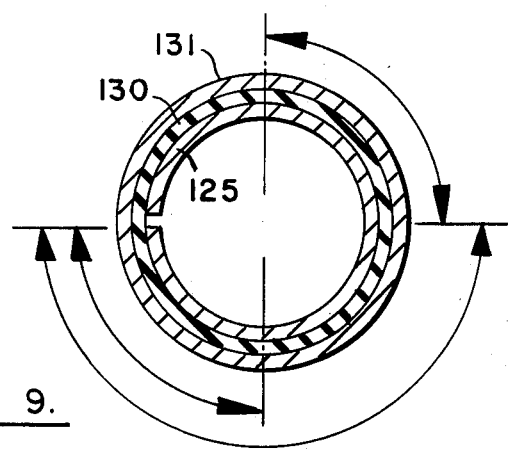
FIG. 9 is an enlarged transverse sectional view taken on line 9—9 of FIG. 8 to illustrate an externally-mounted stabilizer.

According to the present invention, this function is provided by stabilizer means which yieldingly engages the wall members laterally intermediate their opposite ends. The stabilizer means may engage either the outsides of the members, the insides thereof, or both the insides and the outsides. In the simplified embodiments illustrated in FIGS. 6–9, the stabilizer means includes a band of elastomeric material 130 which surrounds the wall member 125 and an inextensible ring, or collar, 131 which snugly embraces the elastomeric band 130. Alternatively, the stabilizer means may include a layer of elastomeric material disposed in the form of a preform 232 engaging the inside of the wall member 225 illustrated in the simplified embodiment of FIG. 10. In yet another simplified embodiment illustrated in FIG. 11, the stabilizer means may include an inner member 331 nested within the outer member 325 and separated therefrom by means of a layer of elastomeric material 330, much like the outer member 25 is separated from its complementary inner member 26 in the embodiment of FIGS. 1–5. The inner member 331 may be coextensive in length with the outer member 325 with its longitudinal edges preferably being offset angularly but, if desired, aligned with one another. Load is applied to the outer member 325 at axially-spaced locations indicated at A, and load is applied to the inner wall member 331 at axially-spaced locations indicated at B, the locations A and B being diametrically opposed. If desired, load may be applied to the members at other locations, such as C indicated in FIG. 11, with some loss of torsional resilience.

Thus, as should be apparent from these simplified embodiments, the desired degree of wall edge motion is afforded, and the structural integrity of the wall member is maintained, by the cooperation of the stabilizer means with its adjacent wall member. The yielding lateral engagement of the stabilizer means with the wall member enables the wall member to twist through a substantial angular displacement while preventing transverse distortion such as buckling.

With the operational theory discussed above with reference to FIGS. 6–11 in mind, reference is again made to the embodiment illustrated in FIGS. 1–5. In this embodiment, the link 16 includes stabilizers which engage both interiorly and exteriorly of the wall member 25 in both a continuous and discontinuous manner along its entire length. To this end, and as best seen in FIG. 2, the link 16 has a centrally located external stabilizer 45 which includes a ring 46 separated from the outer wall member 25 by a layer of elastomeric material 47. A plurality of narrow stabilizers 48–53 of this construction are mounted in axially-spaced relation to the outside of the wall member 25. On opposite sides of this group of relatively narrow stabilizers 48–53, is a pair of wider stabilizers 54 and 55, and on opposite sides of these stabilizers, is another pair of stabilizers 56 and 57 of even greater width. This grouping of stabilizers provides a uniform shearing strain of the elastomer layers.

In this FIGS. 1–5 embodiment, the internal stabilizers are continuous and are provided by the inner wall members 26–40 and the intermediate layers of elastomeric material interposed between the various wall members. In this embodiment, the various wall members 25–40 are nested together in concentric relation with the longitudinal edges of adjacent companion wall members alternating diametrically and with the wall members separated yieldingly by the layers of elastomeric material 35–41 interposed between adjacent wall members. The elastomeric layers 35–41 are relatively stiff in compression and therefore readily transfer radial loads among the wall members. Their relative softness in shear freely permits the desired degree of warping of the wall members. Accordingly, the link 16 has continuous internal stability which provides substantial flexural stiffness without adversely affecting torsional resilience to an undesirable degree.

In the illustrated embodiment of FIGS. 1–5, additional internal shape stability is provided by a series of bushings mounted in axially-spaced relation inside the innermost wall member 40. Preferably, each bushing, such as the bushing 60, is aligned transversely with respect to an external stabilizer, such as the stabilizer 45. The bushings 60 may be fabricated entirely of elastomeric material, or they may be fabricated (as shown) of a relatively thin wall material and spaced from the inside of the innermost wall member 40 by a layer of elastomeric material 61. Desirably, the inner bushings are spaced apart axially by means of gaps to accommodate movement between the ends of the bushings caused by torsion of the link 16.

The link 16 is securely fastened to the inboard and outboard fittings 18 and 19 of the helicopter rotor system in a manner which ensures proper load transfer. To this end, a pair of connecting bolts, 32, 32 extend diametrically through the stack of wall members 25–40 and the outboard fitting 19 of the rotor 12. In a like manner, a pair of connecting bolts 33, 33 extend diametrically through the stack of wall members 25–40 and the inboard fitting 18 on the hub 14. In the illustrated embodiment, both sets of bolts 32, 33 are disposed in the same plane which is the vertical center plane in FIG. 5. Thus, the bolts 32 and 33 engage the wall members 25–40 at locations equidistant from their longitudinally-extending edges to minimize suppression of warping of the wall members. In order to prevent structural interference, the slots defined by the longitudinal edges of the various wall members are enlarged in the zone of the bolts 32 and 33, such as indicated at 25d and 27d in FIG. 4. These increased widths of the gaps between the longitudinal edges of the wall members in the zone of the bolts insures the absence of interference of the bolts with the movement of the edges during warping of the wall members caused by the application of the torque.

Additional internal support for the link 16 in the zone of connection is provided by a pair of end caps 18a and 19a received within the inboard and outboard fittings 18 and 19, respectively of the hub 14 and rotor 12. The main function of the end caps is to diffuse the bending moments applied to the link.

In the embodiment of FIGS. 1–5, the layers of elastomeric material bridge across but do not fill the gaps between the longitudinal edges of the various wall members. While the elastomeric material may fill the gaps between the edges, minimum suppression of warping occurs when the elastomeric material is not present between the longitudinal edges. The elastomeric material may extend continuously along the lengths of the various members, or it may be discontinuous therebetween. Continuous disposition of the elastomeric material between the members facilitates manufacture of the link because the elastomer may be transferred into the spaces between the members after they have been assembled in concentric relation. While the layers of elastomeric material may be bonded to the adjacent surfaces of the wall members, bonding by a separate agent is not absolutely necessary in order to realize the benefits of the present invention. Preferred elastomeric materials include natural or synthetic rubbers, or mixtures thereof, or various combinations thereof in various thicknesses between wall members. While elastomeric materials are preferred, there may be applications where elasticity is not absolutely required, in which event the layers may be provided by yieldable materials such as rigid foams, and the like, which do not have the same degree of elasticity as elastomers. Preferably, the wall members are fabricated of strong lightweight metals, such as titanium, aluminum, steel, berylium-copper, and the like.

In operation, the links 15–17 undergo various loads such as indicated by the arrows in FIG. 1. Because the links 15–17 have substantial axial strength, they are capable of resisting the centrifugal forces imparted thereto by the rotors 11–13. By virtue of their flexural modulii, the links 15–17 are capable of transferring the bending moments applied by the rotors 11–13 to the hub 14. Furthermore, because the links 15–17 are torsionally resilient, the rotors 11–13 can be pivoted about their longitudinal axes through the requisite control angles by the vertical reciprocation of the control rods. Due to their novel construction, the links 15–17 enable the pitch control to be effected with an optimum length of link. By virtue of the multicomponent nature of the construction, the links 15–17 are fatigue resistant, are resistant to corrosion, and are capable of functioning satisfactorily over a broad range of environmental conditions. Fail safety is achieved by virtue of the design redundancy resulting from the laminated nature of the structure.

Figure 12:
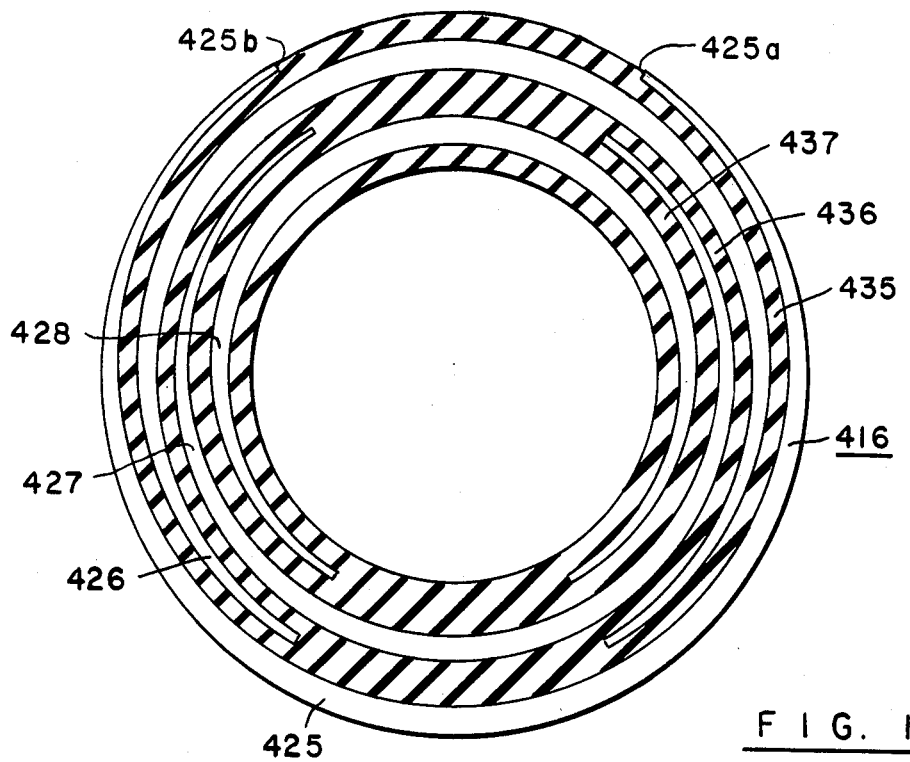
FIG. 12 is a transverse sectional view of another embodiment of the present invention in which a plurality of wall members each of non-uniform thickness and of different diameters are separated by means of layers of elastomeric material.

There may be applications where it is desirable for a link to be provided which has enhanced flexural stiffness. For such applications, a modified embodiment of the present invention is provided. As best seen in FIG. 12, the modified embodiment 416 comprises a series of wall members 425, 426, 427 and 428 each having a pair of longitudinal edges, such as the edges 425a and 425b of the member 425. The members 425–428 are yieldingly separated from one another by layers of elastomeric material 435, 436, and 437 interposed therebetween in the manner described heretofore. The edges of adjacent wall members are offset angularly about 180 degrees, i.e. at diametrical locations, and the members extend through an arcuate extent of about 300 degrees. In this embodiment, increased flexural stiffness is obtained by providing each wall member, such as the wall member 425, with a thickness which varies between its edges. The zone of maximum thickness of the member 425 is located at the point where the warping is zero, i.e. equidistant from the edges 425a and 425b, at the bottom in FIG. 12. The thickness may vary in a linear fashion such as illustrated. Also, longitudinal stringers may be provided in the zone of maximum thickness, such as the stringers provided in the manner illustrated in FIG. 17. With these structures, flexural stiffness is increased over that which would be available if the wall members were of a constant thickness throughout their length; however, the torsional resilience relative to such a structure is not adversely affected to an undesirable degree.

Figure 13:
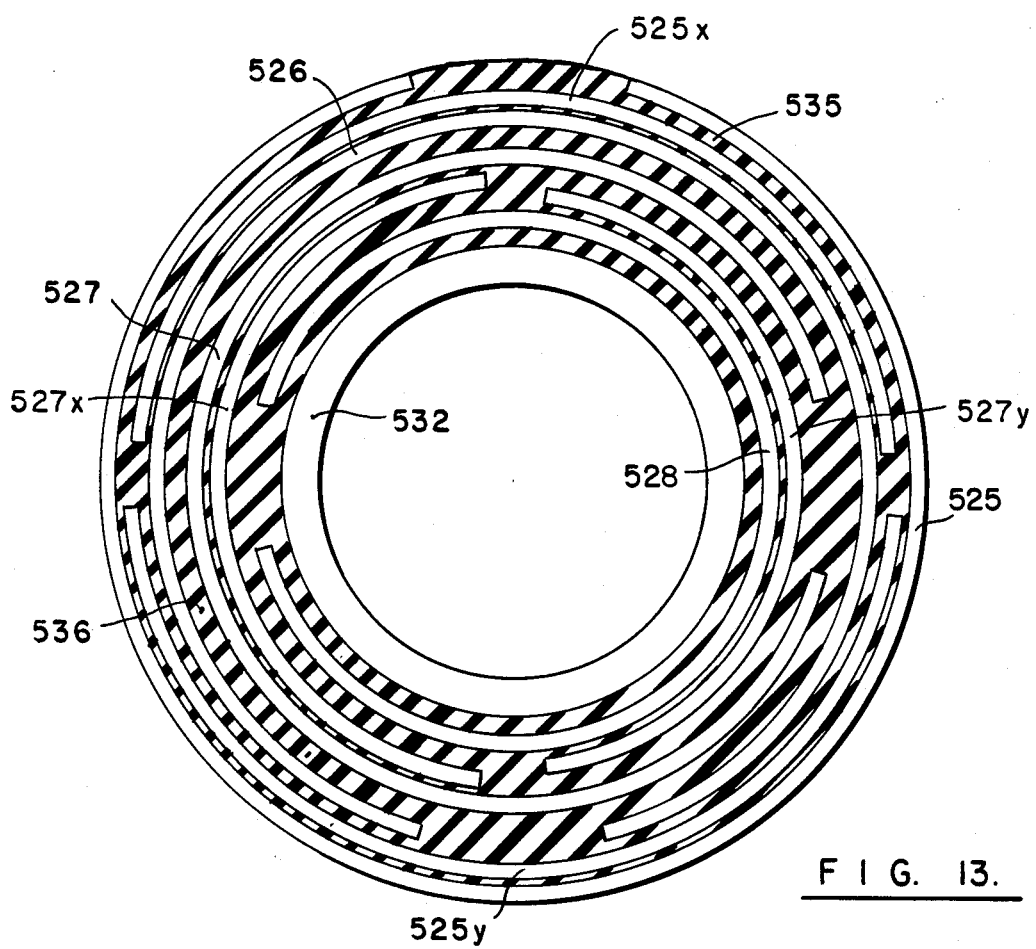
FIG. 13 is a transverse sectional view of yet another embodiment of the present invention, the view illustrating arcuate flexural stiffeners carried in the elastomeric layer between adjacent wall members.

According to the present invention, increased flexural stiffness may be provided in yet another manner. Referring now to FIG. 13, it may be seen that these characteristics are achieved by providing a link having a plurality of elongated members of constant thickness associated with elongated flexural stiffeners extending therealong and carried in the elastomeric layer which is interposed between adjacent wall members. Thus, a pair of semi-circular stiffeners 525x and 525y are disposed interiorly of the outer member 525 in the elastomeric layer 535 which separates the outer member 525 from its companion member 526. These members 525 and 526 and stiffeners 525x and 525y form a set having longitudinal edge gaps which are offset 180 degrees with respect to one another and which are disposed vertically in FIG. 13. In a like manner, another set of wall members and stiffeners including a member 527 with which is associated a pair of stiffeners 527x and 527y is carried within an elastomeric layer 536 which separates the wall member 527 from its companion wall member 528. It is noted that the gaps between the edges of the wall members 527 and 528 are offset 180 degrees with respect to one another and are further offset 90 degrees with respect to the edges of the wall members 525 and 526, being disposed horizontally in FIG. 13. An inner metal segment 532 may be provided interiorly of the innermost member 528. With this structure, improved flexural modulus is obtained by virtue of the stiffeners 525x, 525y and 527x and 527y. The stiffeners do not, however, undesirably detract from the torsional resilience of the unit 516 because of the interaction of the stiffeners in shear with their associated wall members via the elastomeric layers in which the stiffeners are embedded.

While the embodiments illustrated in FIGS. 12 and 13 may be fabricated by preassembling the members and transferring the elastomeric layers therebetween, they may also be assembled by prefabricating complementary sets of inner and outer members, such as the outer set of members 425 and 426, and sliding or pressing the inner complementary set of members 427 and 428 axially thereinto. The same assembly technique may be used with respect to the inner and outer sets of wall members and stiffeners illustrated in FIG. 13.

Figure 14:
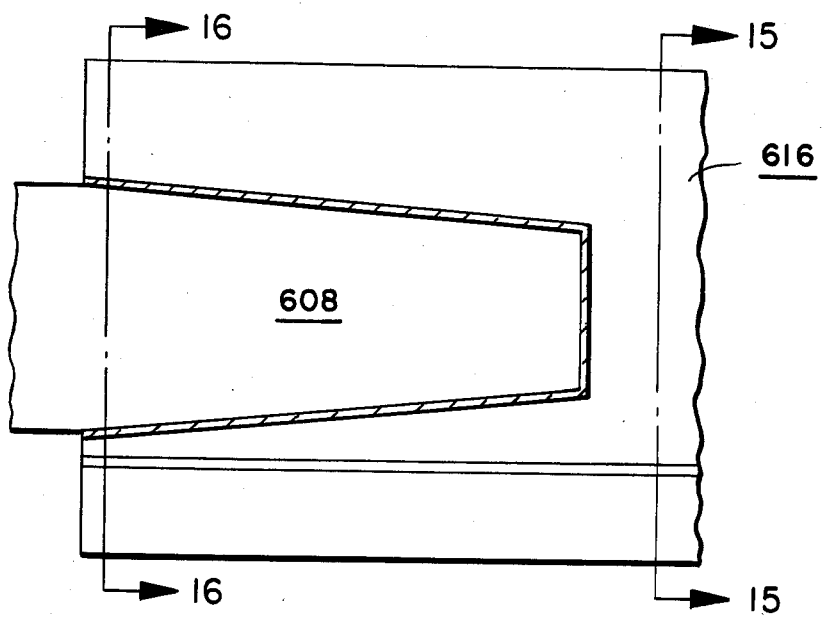
FIG. 14 is a fragmentary view of an end portion of an embodiment of the present invention having a bipartite cross-sectional configuration of wall members.
Figures 15, 16:
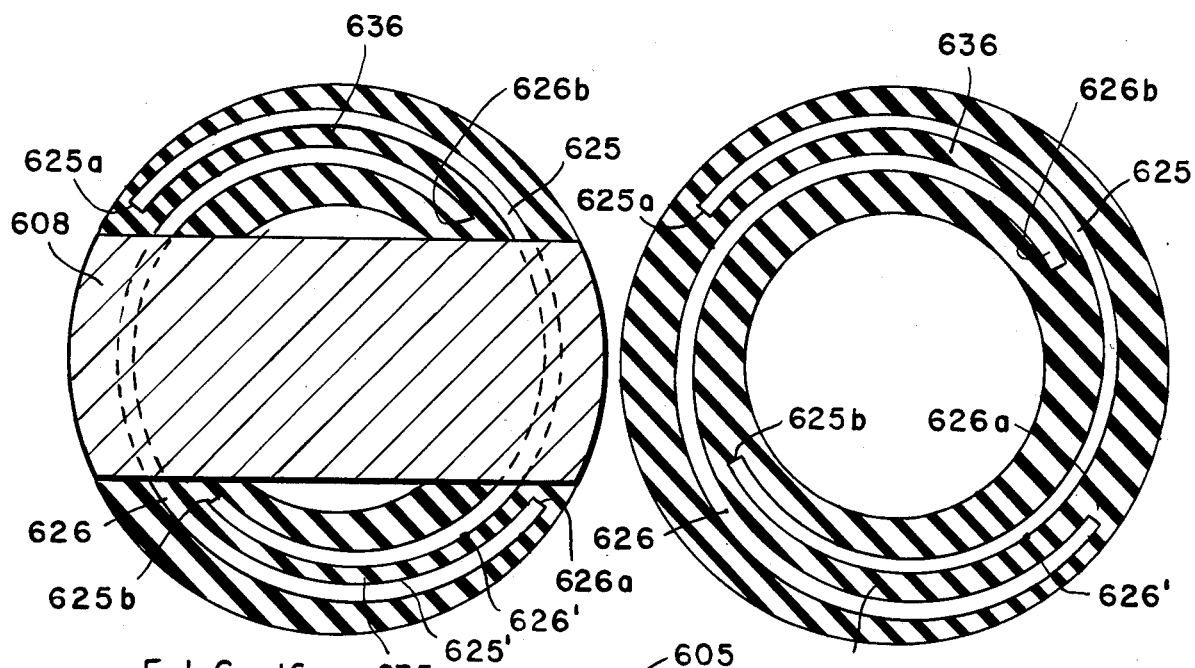
FIG. 15 is a sectional view taken on line 15—15 of FIG. 14.
FIG. 16 is a transverse sectional view taken on line 16—16 of FIG. 14.
Figure 17:
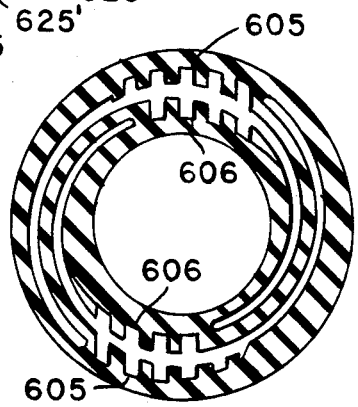
FIG. 17 is a transverse sectional view of yet another embodiment of the present invention having a bipartite cross-sectional configuration of thin wall members with longitudinal stringers.

A further embodiment of the present invention may be provided which has the advantage of simplifying fabrication. This embodiment is illustrated in FIGS. 14–16. As best seen in FIG. 15, in this embodiment, the structural element 616 is provided by a pair of members 625 and 626 each having a circular spiral transverse cross-sectional configuration with longitudinally-extending edges 625a, 625b and 626a, 626b. Each wall member, such as the outer member 625, has a portion which has an inner surface 625' overlapping a portion of the inner member 626 having an outer surface 626'. A layer of elastomeric material 635 is interposed between the surfaces 625' and 626' to space the same from one another and to afford the desired degree of longitudinal freedom noted heretofore. Another layer of elastomeric material 636 is similarly interposed between the other overlapping wall portions diametrically opposite the surfaces 625' and 626'. This structure has the advantage of permitting the elastomeric layers 635 and 636 to be applied to the members 625 and 626 prior to their being formed into their desired shapes and assembled by inserting a portion of one member into the gap between the longitudinal edges of the other and sliding the same axially prior to subsequently bonding the members together. Thus, a structural element is formed having a bipartite cross-sectional configuration. If desired, the flexural stiffness of the bipartite configuration illustrated in FIG. 15 may be further enhanced by providing the same with a plurality of longitudinally-extending stringers 605, 605 and 606, 606 such as illustrated in FIG. 17. Loads are applied to the link 616 by means of a trapezoidal-shaped connector 608 which extends inwardly from the ends of the members 625 and 626 to interconnect the same with one another and with a load.

Figure 18:
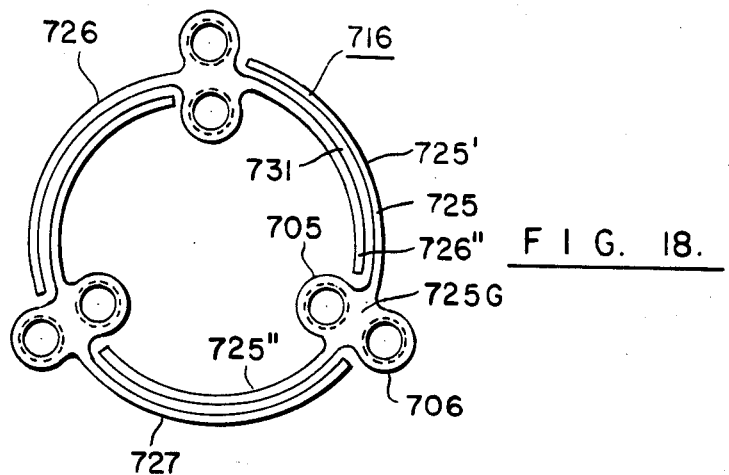
FIG. 18 is a transverse sectional view of a still further embodiment of the present invention which has a tripartite cross-sectional configuration of thin wall members.
Figure 19:
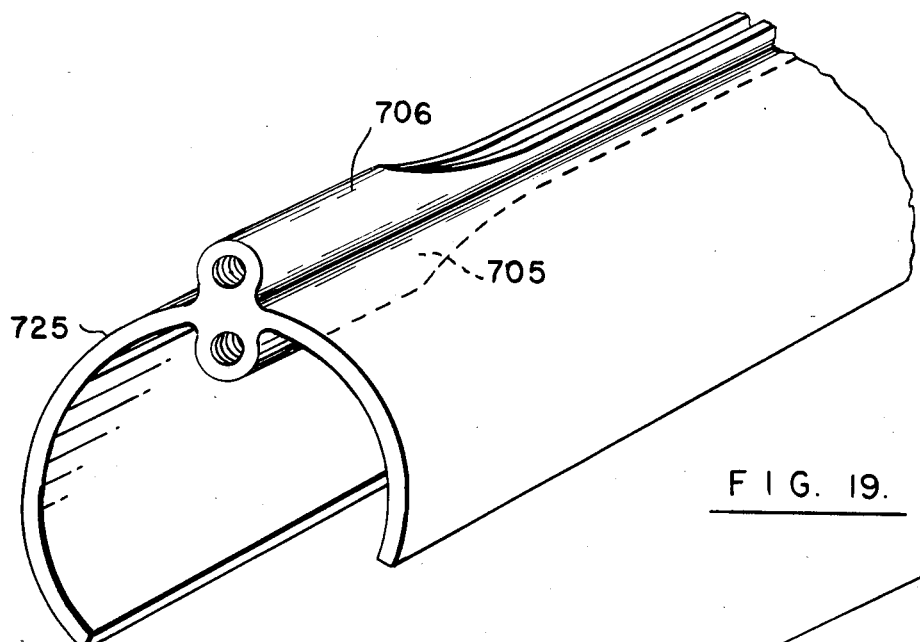
FIG. 19 is a fragmentary perspective view of one of the members incorporated in the embodiment of FIG. 18.

A still further embodiment of the structural element of the present invention is disclosed in FIGS. 18 and 19. In this embodiment, the structural element is formed of members which are interarranged in a three flanged beam, tripartite cross-sectional configuration with desirable axially-bolted attachment fittings. To this end, this structural element 716 comprises three identical extruded metal members 725, 726 and 727 interdigitated with respect to one another to provide a tripartite configuration. Each member, such as the member 725, has a longitudinally-extending web portion 725g with longitudinally-extending inner and outer stringers 705 and 706 which are relieved or milled intermediate the ends of the member 725 in the manner illustrated in FIG. 19. The stringers 705 and 706 are internally threaded for receiving bolts to enable the wall member 725 to be connected at their opposite ends to the load applying structures.

In this embodiment the member 725 has a pair of relatively thin arcuately extending wall portions 725' and 725" overlapping corresponding wall portions of the members 726 and 727 in the manner illustrated in FIG. 18. A layer of elastomeric material is interposed between the overlapping wall portions, such as the layer 731 interposed between the portion 725' of the member 725 and the portion 726" of the member 726. With this structure, improved flexural modulus is obtained by virtue of the longitudinal stringers; however, because the stringers are recessed along their lengths, their presence does not adversely affect torsional resilience to a sufficiently great extent as to be undesirable. The presence of the elastomer between the overlapping wall portions allows the members to warp with respect to one another during application of torque while providing the desired enhanced load carrying capabilities. It is noted that the edges of each member must be spaced from the stringers of its complementary member in order to prevent interference therebetween during application of torque. This embodiment also provides the advantage of being relatively easy to assemble because it allows the layers of elastomeric material to be applied to the surfaces of the members prior to their being interdigitated in the manner illustrated in FIG. 18. In this embodiment, the members extend through an arcuate extent of about 220 degrees, as contrasted with the embodiment of FIG. 15 wherein the arcuate extent of the members is about 270 degrees. When mounting the structural element 716, care should be taken to ensure that the end edges of each member are free to warp and are not constrained against warping in a plane orthogonal to the longitudinal axis of the structural element.

Depending upon various factors, such as length, diameter and applied torsional load, a longitudinally split tube undergoes lengthwise foreshortening. This foreshortening concept may best be understood by reference to FIGS. 7 and 7A wherein a pure torsional load is illustrated being applied to the wall member 125. With the top left hand end of the member 125 constrained against rotation, the pair of connector holes pivot through an angle from the full line to the broken line position indicated. As illustrated in FIG. 7A, the right hand pair of connector holes move toward the left by a slight amount due to the lengthwise foreshortening of the entire member 125. For a given amount of angular displacement, the amount of foreshortening is proportional to the square of the radius and inversely proportional to the length of the member. Thus, it should be apparent that in a link having a series of members of decreasing radii, the outermost member will foreshorten significantly more than the inner member for a given amount of angular displacement.

The present invention provides a load applying means which accommodates the aforementioned relative foreshortening of nested members of different diameters. In brief, this is accomplished by providing an end fitting which engages the inner member for a greater distance inwardly of one end than the fitting engages the outer member. This, in effect, shortens the warping length of the inner member and thereby causes it to foreshorten by the same amount as the outer wall member foreshortens when both are torqued about the longitudinal axis of the assembly.

Figure 20:
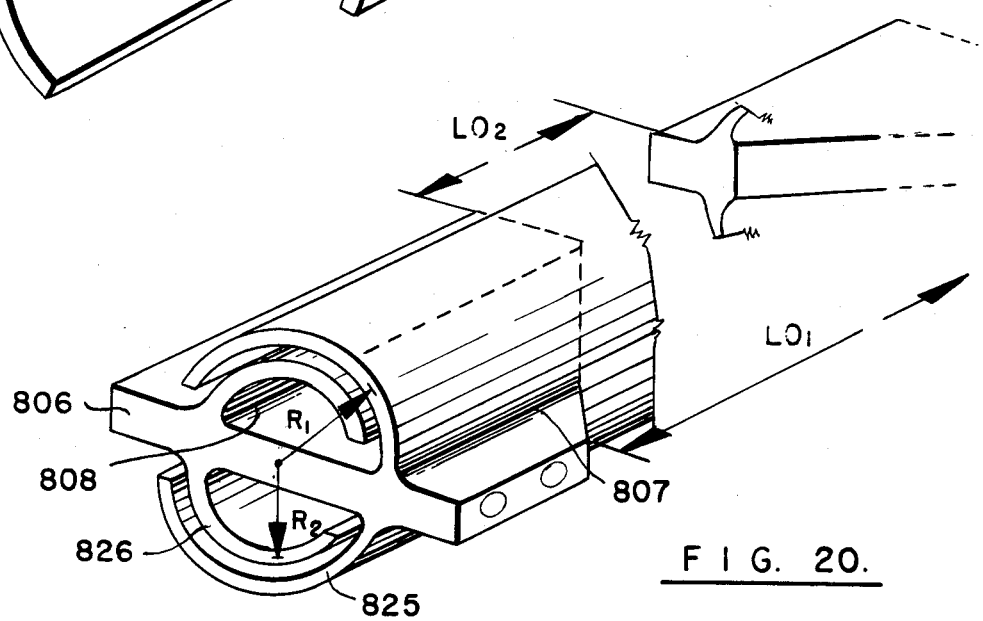
FIG. 20 is a fragmentary perspective view of an end mounting fitting which is designed to accommodate the relative longitudinal foreshortening which occurs between the wall members during twisting.

One preferred form of end fitting is illustrated in FIG. 20. As best seen therein, the end fitting 806 has a web portion which extends diametrically through the gaps between the longitudinal edges of the outer wall member 825 and the inner wall member 826 which extends inwardly therealong. The wall member 825 and 826 are welded to the fitting 806 by any of several well known techniques, such as electron beam welding. In this embodiment, the length of the welded connection 807 between the fitting 806 and the outer wall member 825 may be seen to be shorter than the length of the welded connection 808 between the end fitting 806 and the inner wall member 826. The magnitude of the length of the weld 808 can be determined by applying the following equation: $L_{02} = L_{01}(R_2/R_1)^2$. Thus, with this end fitting arrangement, the effect of longitudinal foreshortening of two nested tubes of different radii can be accomodated.

To demonstrate the utility of the present invention for its intended purpose, a link has been constructed and subjected to several tests to evaluate its axial strength, its flexural and torsional stiffness, and its fatigue life. The link was constructed substantially in accordance with FIGS. 21-24. It comprised a series of three longitudinally split tubes nested together in the manner illustrated in FIG. 23 and separated from one another by means of a continuous layer of elastomeric material. Loads were applied at opposite ends by means of fittings such as illustrated in FIGS. 22 and 24.

By way of example, and not by way of limitation, the tested link had a length of 14.25 inches measured inboard of the innermost edges of bolted spacers. The members were fabricated of aluminum alloy 6061T6 having an ultimate strength of 41,500 psi and yield strength of 39,000 psi. The weight of the three members was 0.70 pounds. Each member had a uniform wall thickness of 0.049 inches. The limit of proportionality in the case of a thin walled specimen subjected to tensile stress was determined to be 24,000 psi, and the limit of proportionality in shear was determined to be 12,000 psi. The elastomeric layer interposed between the various wall members had a thickness of 0.075 inches and was provided by rubber which was a blend of natural rubber and butadiene having a static simple shear modulus of 96 to 110 psi. The outside diameter of the link was 1.50 inches, measured transversely of the exterior stabilizers which were separated from the outermost wall member by a rubber layer of the aforementioned thickness. The link had a mean aspect ratio of 10 and a mean slenderness ratio of 28.

The link had a mean coefficient of warping suppression of 0.174 as defined by the following equation: $Eta = B_2/B_1$, wherein $B_2$ is the angle subtending an arc along which suppression is complete and wherein $B_1$, is the angle subtended by the arc of the entire member.

The angles $B_2$ subtended by the clamped arcs were 43 degrees for the outermost member, 54 degrees for the intermediate wall member, and 73 degrees for the innermost member. $B_1$ for each wall member was 330 degrees. The independent variable for the outermost wall member was 0.626, for the intermediate member was 0.493, and for the innermost member was 0.362. The independent variable for the array of wall members was 0.57. The independent variable factor is defined by the following equation:

$$\frac{1}{x} = \frac{B_2° \ r^2}{L \ t \ 35.53}$$

When tested, the link exhibited a torsional stiffness of 8 inch pounds per degree of displacement. It had an ultimate strength in tension of 9087 pounds, and an ultimate strength in bending of 5625 inch pounds. It had an ultimate strength in shear (transverse to its longitudinal axis) of 300 pounds. Its limits of proportionality were as follows: in tension 4876 pounds, in bending 2812 inch pounds, and in transverse shear 150 pounds.

The link had a ratio of flexural stiffness to torsional stiffness of 46. This ratio was obtained from the following equation:

$$\frac{2EI}{\frac{Mx}{\theta} L \ 57.3}$$

In this equation, EI is the product obtained from the cantilever test, $M_x/\theta$ is the measured torsional stiffness in inch pounds per degree, and L is the nominal length of the link.

The link was subjected to cyclic angular displacement in a fatigue testing machine to simulate the angular displacement encountered in the horizontal flight conditions of a helicopter. A 7 degree collective mean angular displacement was superimposed on a +5 degree of cyclic alternating angular displacement such as the displacement encountered in horizontal flight by the advancing blade (−5 degrees) and the displacement encountered during its retreat (+5 degrees). The angular displacement was applied at a rate of 7 cycles per second, and the torsional spring rate was monitored by computer during running.

The fatigue test results showed that the link was capable of withstanding the aforementioned cyclic angular displacement for over seven million cycles of operation without significant deterioration of its mechanical properties. Its torsional spring rate measured during testing, remained constant.

A test was conducted to determine the effect of the elastomeric layer on the properties of three slotted tube wall members sized and interarranged in an array as indicated in FIG. 23. This test was conducted both with and without elastomeric layers of the same thickness and composition as in the preceding test link intermediate the members. From this test, it was determined that the tensile, or axial, stiffness of the array was increased by 20% by the inclusion of the elastomeric layers therebetween. The flexural stiffness of the array was increased by 50% and the transverse shearing stiffness of the array was increased by 40% when the elastomer layers were present. Thus, it should be apparent that the presence of the elastomeric layers intermediate the members serves not only to provide the desired degree of torsional resilience, but it also serves to increase other mechanical properties of the laminated assembly.

The torsional stiffness of the elastomeric torsion link of the present invention is proportional to the first power of its effective diameter. In contrast, the torsional stiffness of conventional elastomeric bearings is proportional to higher powers of their outside diameters. Thus, it is difficult to obtain relatively large angular displacements with conventional elastomeric bearings of small diameters. Such displacements can, however, be achieved with the torsion link of the present invention.

By utilizing a hybrid combination of the torsion link of the present invention with an elastomeric bearing, a unit can be fabricated with the capability of providing greater angular displacements than can be obtained with conventional elastomeric bearings alone and of transmitting greater bending moments than can be obtained by use of the torsion link of the present invention alone. This may be accomplished by engaging the torsion link of the present invention a predetermined distance outwardly from one end by means of a support having the elastomeric bearing interposed between the support and the torsion link. The support may include a secondary structure surrounding the torsion link, or it may include an internal secondary beam extending axially on the interior of the link. This hybrid link is torsionally resilient and flexurally stiff.

As discussed heretofore, the preferred yieldable material interposed between the wall members is an elastomer such as a natural or synthetic rubber or a combination of such elastomers. Depending upon the desired end result, the elastomer may include additives either to increase or to decrease its hysteresis. If desired, the shear modulus of the elastomeric layers may be reduced by surface embossment should a reduced shear modulus be desired for a particular application. Moreover, while bonding of the elastomeric layers to the various wall members either by means of a separate adhesive or by means of vulcanization is preferred, such bonding is not absolutely necessary for all applications, it being sufficient for there to be a close fit relationship between the elastomeric layer and the adjacent wall members sufficient to cause the elastomeric layer to deform in shear when torque is applied. Furthermore, it is desirable for the elastomer to be disposed in a continuous manner between the wall members to prevent dust or other foreign or corrosive matter from migrating into the interior of the link when operating under adverse environmental conditions.

An important advantage of utilizing elastomeric material, such as rubber, to separate the members from one another resides in the ability of the elastomeric layer to shear elastically to a controlled degree and thereby to permit the relative warping of the wall members during the application of a torque. Because of its elasticity, the elastomeric layer will assist return movement of the members to their unstressed or relaxed configurations upon removal of applied torque. Since the elastomer layer is relatively stiff in compression, it will transmit compressive loads transversely of the members and is, therefore, highly beneficial in distributing flexural stresses interiorly of the link.

In view of the foregoing, it should be apparent that the present invention now provides a structural element, or link, which has substantial axial strength, is flexurally stiff and torsionally resilient, i.e. it can withstand substantial angular displacements between its ends without failure. The link of the present invention is also light in weight, resistant to deterioration caused by various corrosive elements, and safe to use by virtue of its high endurance limit and redundant laminated construction. Accordingly, the link of the present invention finds particular utility as a means for attaching rotors to a hub in a helicopter rotor system.

While preferred embodiments of the present invention have been described in detail, various modifications, alterations and changes may be made without departing from the spirit and scope of the present invention as defined in the appended claims.

I claim:

1. For use in providing an axially and flexurally stiff and torsionally resilient connection between adjacent structural members, a link comprising: at least one open section member having a predetermined transverse cross-sectional configuration at least partially encircling a longitudinal axis, said open section member having longitudinal edges separated from one another along said axis and having end edges at opposite ends thereof, mounting means at axially-spaced locations adjacent to opposite ends of said open section member for permitting torque to be applied thereto by said structural members, and means carried by said open section member intermediate its ends for stabilizing said transverse configuration of said open section member under various loads, said stabilizer means permitting said longitudinal edges to move relative to one another when torque is applied to said open section member about said axis by said structural members, said mounting means engaging said open section member with respect to its end edges and its longitudinal edges to permit said end edges to warp substantially freely with respect to a plane orthogonal to said axis during said torque application.

2. The structural element according to claim 1 wherein said open section member has inner and outer surfaces, and said stabilizer means includes a layer of elastomeric material engaging at least one of said surfaces transverse to said longitudinal axis.

3. The structural element according to claim 2 wherein said elastomeric material surrounds the outer surface of said open section member.

4. The structural element according to claim 3 wherein said stabilizer means includes a collar surrounding said layer of elastomeric material to sustain said predetermined transverse cross-sectional configuration while enabling said layer of elastomeric material to afford said relative longitudinal edge motion interiorly of said collar.

5. The structural element according to claim 4 wherein said stabilizer means includes a plurality of said collars and elastomeric layers mounted at axially-spaced locations on said open section member.

6. The structural element according to claim 2 wherein said layer of elastomeric material engages the inner surface of said open section member and is surrounded thereby to sustain said wall configuration during application of said loads.

7. The structural element according to claim 6 wherein said layer of elastomeric material has an annular shape which resists said loads while affording said longitudinal edge motion during application of said torque.

8. The structural element according to claim 7 wherein said stabilizer means includes a plurality of said annular-shaped layers of elastomeric material mounted at axially-spaced locations inside said open section member.

9. The structural element according to claim 1 wherein said mounting means spaces transverse edges of said open section member axially from said structural members at opposite ends of said link.

10. The structural element according to claim 1 wherein said mounting means engages said open section member equidistant from its longitudinal edges to minimize suppression of warping of said end edges.

11. The structural element according to claim 1 wherein said mounting means includes cap means telescopically receiving at least one end of said open section member at one of said axially-spaced locations for providing a space between said end edges and an adjacent one of said structural members to minimze suppression of warping of said end edges.

12. The structural element according to claim 1 wherein said stabilizer means includes at least one other companion open section member substantially coextensive in length with said first-mentioned open section member and also having a pair of lengthwise extending edges, said open section members being arranged with portions thereof overlapping one another to cause said structural element to define a tube-like configuration, and a layer of elastomeric material interposed between said overlapping open section portions to afford said relative motion of said longitudinal edges upon application of said torque.

13. The structural element according to claim 12 wherein each of said open section members has inner and outer surfaces, and said open section members are interdigitated with the outer surface of one open section member disposed alongside the inner surface of the other open section member and with the inner surface of said one open section member disposed alongside the outer surface of said other open section member.

14. The structural element according to claim 13 wherein said open section members have similar transverse cross-sectional configurations with their longitudinal edges extending in parallel relation to form gaps therebetween, and wherein each open section member has a portion extending through the gap of its companion member to provide a bipartite configuration.

15. The structural element according to claim 14 wherein said stabilizer means further includes at least a third other like open section member similarly interdigitated with said first and second mentioned open section members and an intermediate layer of elastomeric material to provide a tripartite configuration.

16. The structural element according to claim 14 wherein each open section member has at least one axially-extending stringer which is internally threaded at opposite ends to provide said mounting means.

17. The structural element according to claim 12 wherein said open section members are nested together with portions of one open section member being embraced within corresponding portions of its companion open section member.

18. The structural element according to claim 17 wherein said open section members have similar cross-sectional configurations and are interarranged with a portion of one open section member spanning across the gap defined between the longitudinal edges of its companion open section member to provide a closed tube-like configuration.

19. The structural element according to claim 18 wherein said open section member cross-sections are substantially circular and said longitudinal edge gaps of said open section members are disposed on diametrically-opposite sides of said longitudinal axis.

20. The structural element according to claim 18 wherein each open section member has a thickness which varies from a minimum adjacent to its longitudinal edges to a maximum equidistant from said longitudinal edges for increasing the flexural stiffness of said structural element without substantially decreasing its torsional resilience.

21. The structural element according to claim 20 including a second set of like open section members mounted interiorly of said first-mentioned set and separated therefrom by another layer of elastomeric material.

22. The structural element according to claim 21 wherein the longitudinal edge gaps of the outer open section members in each set are in substantial alignment with one another.

23. The structural element according to claim 18 including a set of auxiliary stiffeners interposed between adjacent open section members in said elastomeric layer separating said open section members for increasing the flexural stiffness of said structural element without substantially decreasing its torsional resilience.

24. The structural element according to claim 23 wherein said auxiliary stiffeners are disposed on opposite sides of said longitudinal axis and have cross-sectional configurations complementary to the configurations of said open section members but of a lesser extent.

25. The structural element according to claim 24 including a like inner set of open section members and auxiliary stiffeners similarly disposed interiorly of the first-mentioned set with a layer of elastomeric material interposed between said sets and with the longitudinal edge gaps of the inner set of open section members being offset angularly with respect to the edge gaps of said outer set of open section members.

26. The structural element according to claim 1 wherein said open section member is fabricated of metal and said stabilizer means is fabricated of a pliable composition.

27. The structural element according to claim 26 wherein said pliable composition includes an elastomeric material.

28. The structural element according to claim 27 wherein said elastomeric material includes of natural or synthetic rubber or mixture thereof.

29. The structural element according to claim 26 wherein said pliable composition is bonded to said metal coextensive with its length.

30. The structural element according to claim 18 wherein each of said open section members has a substantially circular transverse cross-section with said longitudinal edges being spaced from one another by a gap and with said elastomeric spanning said gap.

31. The structural element according to claim 30 wherein said elastomeric material fills said gap between said edges.

32. The structural element according to claim 1 wherein said mounting means includes at least one aperture in said open section member for receiving connector means adapted to protrude through said aperture for connecting said link to said adjacent structural members.

33. The structural element according to claim 1 including another like open section member interarranged with the first said open section member to form a tube-like configuration and with the longitudinal edges of each open section member being angularly offset relative to one another, a layer of elastomeric material interposed between said open section members, and wherein the longitudinal edges of said open section members have zones of greater separation adjacent opposite ends thereof.

34. The structural element according to claim 1 including a pair of said open section member substantially coextensive in length interarranged with one open section member inside the other and with their longitudinal edges angularly offset with respect to one another, and wherein said mounting means engages the inner member inwardly of one end of its ends for a distance greater than the distance said mounting means engages the outer member to accommodate lengthwise foreshortening caused by application of said torque.

35. The structural element according to claim 34 wherein said inner open section member is nested within the outer open section member with the longitudinal edges of the members diametrically offset, and wherein said mounting means engages said open section members at diametrical locations opposite the locations of their edge gaps and extends therealong for said distances.

36. A link for use in transmitting various axial, transverse and flexural loads, comprising:
at least a pair of open section members formed into a predetermined transverse cross-section about a longitudinal axis, said open section members each having a pair of longitudinal edges extending continuously in closely-spaced relation along said axis between opposite ends of said open section members to form a gap therebetween, said open section members also having end edges at opposite ends thereof, said open section members being interarranged with overlapping portions providing said link with a tube-like configuration,
mounting means embracing each open section member adjacent the ends thereof for applying a load to said link at axially-spaced locations while permitting said end edges to warp with respect to a plane orthogonal to said axis, and
resilient stabilizer means interposed between said overlapping portions of said open section members for spacing the same from one another while yieldingly affording relative motion between said longitudinal edges upon application of a torque,
whereby said link is characterized by axial and transverse strength, flexural stiffness and torsional resilience.

37. The link according to claim 36 wherein said resilient stabilizer means further includes at least one band of elastomeric material surrounding said interarranged open section members and a collar surrounding said band.

38. The link according to claim 36 wherein said resilient stabilizer means further includes at least one preform of elastomeric material disposed interiorly of said interengaged open section members.

39. The link according to claim 36 wherein said open section members have substantially circular cross-sections and are nested together with the edge gaps offset angularly with respect to one another to close the interior of said tube-like structure.

40. The link according to claim 36 wherein said open section members have substantially circular cross-sections and are interdigitated with an inside portion of one open section member being disposed along an outside portion of the other open section member and with said other open section member having a portion extending through the gap between the edges of said one open section member.

41. The link according to claim 36 wherein said resilient stabilizer means includes a layer of elastomeric material extending continually between said overlapping portions.

42. A structural element particularly suited for use in carrying various axial, transverse, and flexural loads, comprising:
at least one open section member formed about a longitudinal axis into a predetermined transverse tube-like cross-section, said open section member having a pair of longitudinal edges extending lengthwise along said axis in separated relation with the separation therebetween being less than half the length of the perimeter of said cross-section, said open section member also having opposite end edges disposed transversely with respect to said longitudinal axis,
mounting means engaging said open section member and affording the application of a load to said structural element at axially-spaced locations adjacent to said end edges, said mounting means permitting said end edges to warp during load application, and
stabilizer means yieldingly engaging said open section member intermediate said axially-spaced locations for sustaining said predetermined transverse configuration during said load application and resiliently accommodating relative motion between said longitudinal edges when a torque is applied,
whereby the structural element is characterized by axial and transverse strength, flexural stiffness, and torsional resilience.

43. A structural link, comprising:
at least one pair of elongated, thin wall open section members each having a tube-like configuration with a pair of longitudinal edges separated from one another and having edges at opposite ends, said thin wall open section members being interarranged with a portion of one overlapping a portion of the other for a substantial portion of their respective lengths, a layer of elastomeric material engaged between said overlapping portions of said open section members to separate the same while permitting relative motion between each pair of longitudinal edges, means adjacent opposite ends of said thin wall open section members adapted to afford the application of torque to both of said thin wall open section members at different angular locations with the angular location of load application for said thin wall open section members being opposite their respective pairs of longitudinal edges, said torque applying means surrounding said open section members and being spaced from the end edges thereof, whereby the elastomeric layer affords edgewise relative movement between the open section members when a torque is applied to the link and cooperates with the open section members to stabilize the open section members during application of other loads.

44. The structural link according to claim 43 wherein said pairs of longitudinal edges are coextensive in length with said open section members and are offset angularly to define a closed tube.

45. The structural link according to claim 43 including at least one elastomeric layer surrounding said open section members exteriorly and interiorly thereof intermediate their ends, and means maintaining said elastomeric layer laterally engaged against said open section members.

46. For use in providing an axially and flexurally stiff and torsionally resilient connection between structural members spaced from each other along a longitudinal axis, a structural element comprising:

a pair of elongate open section members extending generally parallel to said axis, said open section members each having a predetermined transverse cross-sectional configuration at least partially encircling said longitudinal axis between opposite ends thereof and each having longitudinal edges separated from one another by a gap, each open section member also having a inner surface and an outer surface, said open section members being interdigitated with a portion of the outer surface of one open section member being disposed alongside the inner surface of a portion of the other open section member and with a portion of said one open section member extending through the gap between the edges of said other open section member, separate means at axially-spaced locations on said open section members for permitting torque to be applied thereto by the structural members and causing each open section member to twist between its ends, said edges of each of said open section members being relatively movable in opposite directions when torque is applied thereto, and resilient means interposed between said inner and outer open section member surfaces for stabilizing said structural element during application of various loads.

47. The structural element according to claim 46 wherein a portion of the inner surface of said one open section member overlaps a portion of the outer surface of said other open section member.

48. The structural element according to claim 46 including stringer means extending axially of each open section member for a substantial portion of its length to increase the flexural stiffness of said structural element without substantially decreasing its torsional resilience.

49. The structural element according to claim 48 wherein said stringer means includes a series of parallel ribs located substantially equidistant between said longitudinal edges of each open section member.

50. The structural element according to claim 49 wherein said ribs extend radially inward and outward of each open section member, and each open section member has a thickness which varies from a minimum adjacent its edges to a maximum adjacent said ribs.

51. The structural element according to claim 46 wherein said torque applying means is provided adjacent said opposite ends of each of said open section members and mounts said open section members to said structural members.

52. The structural element according to claim 51 wherein said mounting means includes a radially and axially extending enlargement on each open section member adapted to receive a fastener to effect a connection between said open section member and said structural members.

53. The structural element according to claim 46 wherein each open section member has a thickness which varies from a minimum adjacent its longitudinal edges to a maximum substantially equidistant between said edges for increasing the flexural stiffness of said structural element without substantially decreasing its torsional resilience.

54. The structural element according to claim 46 wherein said open section members are fabricated of metal and said resilient means includes an elastomeric material.

55. The structural element according to claim 46 including means providing at least one collar surrounding said open section members intermediate their ends.

56. The structural element according to claim 46 including means providing at least one stabilizer bushing interiorly of said open section members intermediate their ends.

57. For use in providing an axially and flexurally stiff and torsionally resilient connection between structural members spaced from each other along a longitudinal axis, a structural element comprising:

a pair of elongate open section members extending generally parallel to said axis between said structural members, said open section members each having a predetermined transverse cross-sectional configuration at least partially encircling said longitudinal axis and having spaced longitudinal edges, the edges of one open section member being offset angularly with respect to the edges of the other open section member to form a tube-like structure, means at axially-spaced locations on each of said open section members for permitting torque to be applied thereto by said structural members, said edges of each of said open section members being movable relative to one another when torque is applied to said open section members about said axis, resilient means interposed between said open section members, and auxiliary stiffening means extending lengthwise of said open section members, said resilient means and said auxiliary stiffening means increasing the flexural stiffness of said structural element without substantially decreasing its torsional resilience.

58. The structural element according to claim 57 wherein said auxiliary stiffening means includes a pair of stiffeners embedded in said resilient means on opposite sides of said longitudinal axis.

59. The structural element according to claim 57 wherein said auxiliary stiffening means includes a pair of stiffeners each having a cross-sectional configuration complementary to the configurations of said open section members but of a lesser extent about said axis.

60. The structural element according to claim 57 including a like inner pair of open section members and auxiliary stiffening means disposed interiorly of the first-mentioned said pair of open section members and auxiliary stiffening means, and resilient means interposed between said pairs of open section members, the longitudinal edges of the inner pair of open section members being offset angularly with respect to the longitudinal edges of said first-mentioned pair of open section members.

61. The structural element according to claim 57 wherein each of said open section members has a thickness which increases from a minimum adjacent its edges to a maximum equidistant therefrom to provide said auxiliary stiffening means.

62. The structural element according to claim 57 including at least two sets of pairs of said open section members with one set being surrounded by the other and separated therefrom by a layer of said resilient means.

63. A structural element for use in providing an axially and flexurally stiff and torsionally resilient connection between structural members spaced from each other along a longitudinal axis, said structural element comprising:
an inner open section member and an outer open section member extending in generally parallel relationship to said axis and each having a predetermined transverse cross-sectional configuration at least partially encircling said axis, each open section member having spaced longitudinal edges defining a gap therebetween, means at longitudinally-spaced locations on each of said open section members for permitting torque to be applied thereto by said structural members, the application of torque to each of said open section members effecting foreshortening thereof and relative longitudinal movement between its spaced edges, the distance between said locations on said inner open section member being less than the distance between said locations on said outer open section member.

64. The structural element according to claim 63 wherein said inner open section member is nested within the outer open section member with the longitudinal edges of the members diametrically offset, and wherein the torque applying means engages said open section members at locations intermediate the locations of their edges and extends therealong.

65. A structural element particularly suited for use in carrying various axial, transverse, and flexural loads, comprising:
a pair of open section members formed about a longitudinal axis into a predetermined transverse tube-like configuration, each open section member having a pair of lengthwise extending separated edges movable relative to one another when a torque is applied to said open section members, the separation between said edges being less than half the length of the perimeter of said configuration, said open sections members being interdigitated with an outer surface of one open section member extending along an inner surface of the other open section member,
mounting means on said open section members affording the application of a load to said structural element at axially-spaced locations, and
stabilizer means yieldingly engaging between said surfaces of said open section members intermediate said axially-spaced locations for sustaining said predetermined transverse configuration during said load application and resiliently accommodating said relative motion between said edges when a torque is applied,
whereby the structural element is characterized by axial and transverse strength, flexural stiffness, and torsional resilience.

66. A structural link, comprising:
at least one pair of elongated, thin wall members each having a tube-like configuration with a pair of longitudinal edges separated from one another by a gap and movable lengthwise relative to one another when a torque is applied,
said thin wall members being interdigitated with a portion of one overlapping a portion of the other for a substantial portion of their respective lengths and with one member extending between the edges of the other member,
a layer of elastomeric material engaged between said overlapping portions of said thin wall members to separate the same while permitting relative motion between each pair of edges,
means at axially-spaced locations adjacent opposite ends of said thin wall members adapted to afford the application of torque to both of said thin wall members at different angular locations with the angular location of torque application for said thin wall members being intermediate the respective pairs of edges,
whereby the elastomeric layer cooperates with the thin wall members to stabilize the link during application of various loads.

67. A link for use in transmitting various axial, transverse and flexural loads along a longitudinal axis, comprising:
at least a pair of elongate open section members formed into a predetermined transverse cross-section about said axis, said open section members each having a pair of longitudinal edges with a gap therebetween extending continuously in closely-spaced relation between opposite ends of said open section members, said open section members being interdigitated with an inside portion of one open section member being disposed along an outside portion of the other open section member and with said other open section member having a portion extending through the gap between the edges of said one open section member,
separate means located on each open section member at axially-spaced locations adjacent the ends thereof in alignment with the gaps between said edges adapted to apply to said link a torque tending to twist each open section member between its ends and thereby to rotate one end relative to the other, and resilient means interposed between said overlapping portions of said open section members for stabilizing the same upon application of a torque thereto, whereby said link is characterized by axial and transverse strength, flexural stiffness and torsional resilience.

68. A structural element for use in providing an axially and flexurally stiff and torsionally resilient connection between adjacent structural members, comprising: a plurality of elongate open section members each having a predetermined transverse cross-sectional configuration terminating in a pair of longitudinal edges having a gap therebetween, each open section member having an inner surface and an outer surface, said open section members being arranged with a portion of the outer surface of one open section member being overlapped by a portion of the inner surface of another open section member and with a portion of the inner surface of said one open section member being overlapped by a portion of the outer surface of yet another open section member to define a tube-like structure having a longitudinal axis, means at longitudinally spaced locations for twisting each open section member about said axis, and resilient means interposed between said open section member surfaces to stabilize said open section members when torque is applied to said structural element.

69. The structural element according to claim 68 wherein said open section members have arcuate configurations and are three in number.

70. The structural element according to claim 69 wherein each open section member has lengthwise-extending stiffening means located intermediate its longitudinal edges, and including means at opposite ends of said open section members for connecting said stiffening means to said structural members.

71. The structural element according to claim 70 wherein said stiffening means has an axially-extending bore for receiving a fastener to effect a connection between said open section member and said structural members.

* * * * *